(12) United States Patent
Maeda et al.

(10) Patent No.: US 6,702,956 B2
(45) Date of Patent: Mar. 9, 2004

(54) LIQUID CRYSTAL POLYESTER RESIN MIXTURE

(75) Inventors: Mituo Maeda, Tsukuba (JP); Satoshi Nagano, Tsukuba (JP); Manabu Hirakawa, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 63 days.

(21) Appl. No.: 10/178,227

(22) Filed: Jun. 25, 2002

(65) Prior Publication Data

US 2003/0047712 A1 Mar. 13, 2003

(30) Foreign Application Priority Data

Jun. 28, 2001 (JP) ........................................ 2001-196166
Jun. 28, 2001 (JP) ........................................ 2001-196167

(51) Int. Cl.⁷ ..................... C09K 19/20; C09K 19/52; C09K 19/38; C08L 67/03; C08J 5/00
(52) U.S. Cl. ........................ 252/299.67; 252/299.01; 252/299.5; 525/132; 525/397; 524/539
(58) Field of Search ..................... 252/299.01, 299.67, 252/299.5; 525/132, 397; 524/539

(56) References Cited

U.S. PATENT DOCUMENTS 4,438,236 A * 3/1984 Cogswell et al. ............ 525/165
5,830,940 A * 11/1998 Nakamura et al. .......... 524/404

FOREIGN PATENT DOCUMENTS

| JP | 5-125258 A | 5/1993 |
| JP | 5-125259 A | 5/1993 |
| JP | 7-316403 A | 12/1995 |
| JP | 8-12863 A | 1/1996 |
| JP | 8-283556 A | 10/1996 |
| JP | 8-325441 A | 12/1996 |
| JP | 9-26396 A | 1/1997 |
| JP | 9-143347 A | 6/1997 |
| SG | 33349 A1 | 10/1996 |
| SG | 49837 A1 | 6/1998 |

* cited by examiner

Primary Examiner—Shean C. Wu
(74) Attorney, Agent, or Firm—Sughrue Mion, PLLC

(57) ABSTRACT

A liquid crystal polyester resin mixture having a stabilized plastication time and accordingly possible to be molded in constant cycles and giving a molded article excellent in mechanical properties and thermal stability is provided. The liquid crystal polyester resin mixture comprises 100 parts by weight of a liquid crystal polyester resin composition which comprises 100 parts by weight of a liquid crystal polyester and from 0 to 150 parts by weight of a filler, and either from 0.001 to 5 parts by weight of a fatty acid amide having a formula; $R_1$—CO—$NH_2$ (wherein $R_1$ denotes a saturated or unsaturated hydrocarbon of 10 to 30 carbons) or from 0.001 to 2 parts by weight of a high molecular weight polyethylene with a molecular weight of 10,000 or higher.

6 Claims, No Drawings

LIQUID CRYSTAL POLYESTER RESIN MIXTURE

FIELD OF THE INVENTION

The present invention relates to a liquid crystal polyester resin mixture, a liquid crystal polyester resin molded artyicles of the liquid crystal polyester resin mixture, and a method for producing of the molded articles.

BACKGROUND OF THE INVENTION

The liquid crystal polyester resin, generally called as a thermotropic crystal liquid polymer, is remarkably excellent in melt fluidity and heat resistant at 300° C. or higher, so that a molded article of the resin is employed for electronic parts as well as OA (office automation equipment) parts, AV parts, heat resistant containers and the like.

Such molded article is generally produced by injection molding method. It is required for the injection molding method that the time for steps of plasticizing resin and metering plasticized resin (plastication time) in an injection unit is kept constant and stable. If the plastication time is shortened, the time taken for a cooling molten resin (cooling time) in mold unit could be shortened. However, in the case of the liquid crystal polyester resin, the plastication time is hardly kept constant and stable and therefore, plasticizing resin is not sometimes completed within the cooling time to result in problems that it is difficult to finish molding in constant cycles. And consequently, the productivity is decreased and the quality of the obtained molded article is deteriorated.

As a means for solving such problems, a composition comprising a thermotropic liquid crystal polymer, a higher fatty acid metal salt, and a higher fatty acid is disclosed in Japanese Unexamined Patent Publication No. 5-125259.

Also, Japanese Unexamined Patent Publication No. 5-125258 discloses a particle mixture comprising a thermotropic liquid crystal polymer particle, a higher fatty acid metal salt and a fatty acid. Further, Japanese Unexamined Patent Publication No. 9-143347 discloses that a fatty acid ester is added to a liquid crystal polyester resin composition comprising a liquid crystal polyester resin and a filler and Japanese Unexamined Patent Publication No. 8-12863 discloses that a fluoro resin is added to a liquid crystal polyester resin composition comprising a liquid crystal polyester resin and a filler.

However, in above cases, since compounds having a low melting point and being easy to be decomposed at a high temperature is used with heat resistant liquid crystal polymers, there are problems that the gas evolved by the decomposition deteriorates the surface appearance.

SUMMARY OF THE INVENTION

The object of the present invention is to provide a liquid crystal polyester resin mixture having a stabilized plasticization time, possible to be molded in constant cycles, and making it possible to produce a molded article excellent in mechanical properties and heat stability.

Inventors of the present invention have made enthusiastic investigations to achieve the above-described object and consequently found out that a liquid crystal polyester resin mixture obtained by adding specified amount of a specified fatty acid amide or a specified polyethylene to a liquid crystal polyester resin composition has a stable plastication time and is possible to be molded in constant cycles. Moreover, inventors have found out that an obtained molded article is excellent in mechanical properties and heat stability and accordingly have completed the present invention. That is, the invention is to provide a liquid crystal polyester resin mixture comprising 100 parts by weight of a liquid crystal polyester resin composition which comprises 100 parts by weight of a liquid crystal polyester and from 0 to 150 parts by weight of a filler, and either from 0.001 to 5 parts by weight of a fatty acid amide having a formula; $R_1$—CO—$NH_2$ (wherein $R_1$ denotes a saturated or unsaturated hydrocarbon of 10 to 30 carbons) or from 0.001 to 2 parts by weight of a high molecular weight polyethylene with a molecular weight of 10,000 or higher.

DETAILED DESCRIPTION OF THE INVENTION

The liquid crystal polyester to be used for the invention is a polyester called as a thermotropic liquid crystal polymer and includes, for example, the following;

(1) a polymer comprises one or more kinds of aromatic hydroxycarboxylic acids;

(2) a polymer comprises aromatic dicarboxylic acid(s) and aromatic diol(s);

(3) a polymer comprises aromatic hydroxycarboxylic acid(s), aromatic dicarboxylic acid(s) and aromatic diol(s); and (4) a polymer prepared by reacting aromatic hydroxycarboxylic acid(s) with polyesters such as polyethylene terephthalate.

Such polymers form anisotropic melt at a temperature of 400° C. or lower. Additionally, in place of aromatic hydroxycarboxylic acids, aromatic dicarboxylic acids and aromatic diols, their ester-formable derivatives may be included. The ester-formable derivatives of the carboxylic acids include, for example, derivatives which are produced by converting carboxyl groups into highly reactive acid chlorides, acid anhydrides and the like and capable of promoting the reaction of polyester production and derivatives which are produced by esterificating carboxyl groups with alcohols and ethylene glycol and capable of forming polyesters by ester interchange reaction.

The ester-formable derivatives of phenolic hydroxyl groups include, for example, derivatives of compounds having the phenolic hydroxyl groups esterified with carboxylic acids and capable of forming polyesters by ester interchange reaction.

Further, the aromatic hydroxycarboxylic acids, aromatic dicarboxylic acids, and aromatic diols may be substituted with an alkyl such as methyl and ethyl; a halogen atom, and an aryl to the extent that these substituent groups do not interfere with the ester formability.

The repeating monomer unit of the liquid crystal polyester can be exemplified as follows, however it is not limited to the following examples.

The repeating monomer units derived from aromatic hydroxycarboxylic acids:

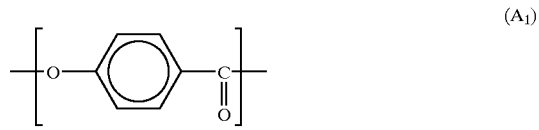

(A₁)

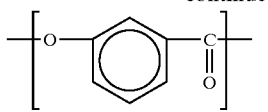
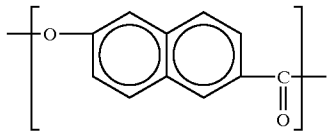
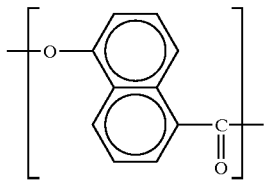
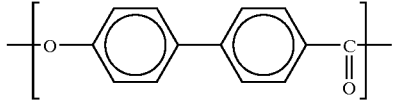

(A₂)

The above exemplified repeating monomer units may be substituted with a halogen atom or an alkyl group.

The repeating monomer units derived from aromatic dicarboxylic acids:

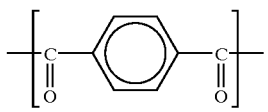

(B₁)

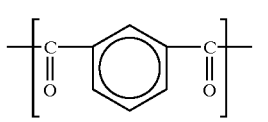

(B₂)

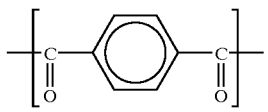
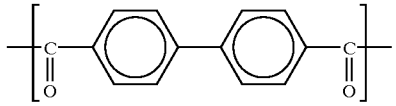
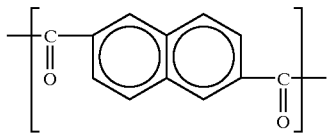
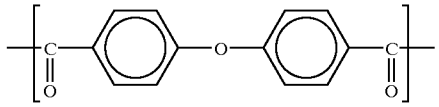
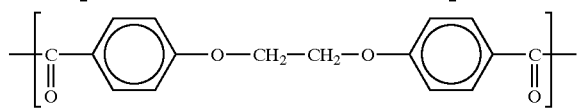

(B₃)

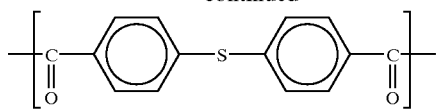

The above exemplified repeating monomer units may be substituted with a halogen atom, an alkyl group, or an aryl group.

The repeating monomer units derived from aromatic diols:

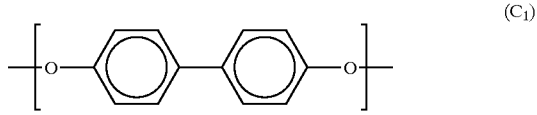

(C₁)

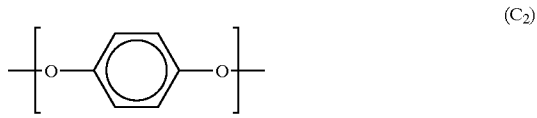

(C₂)

(C₃)

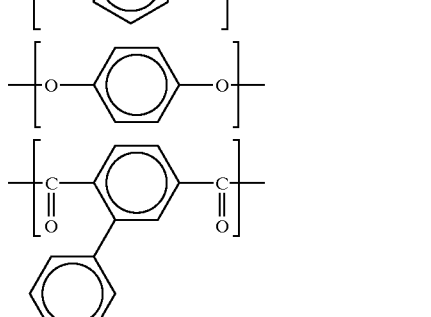
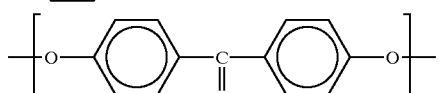
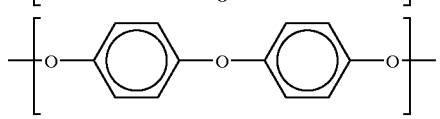

The above exemplified repeating monomer units may be substituted with a halogen atom, an alkyl group, or an aryl group.

In the above exemplified repeating monomer units derived from the aromatic hydroxycarboxylic acids, aromatic dicarboxylic acids, and aromatic diols, the alkyl is preferably an alkyl of 1 to 6 carbons, the aryl is preferably an aryl of 6 to 20 carbons.

From a viewpoint of the balance of heat resistance, mechanical properties, and processibility, the liquid crystal polyester containing 30% by mole of the foregoing repeating monomer unit defined as (A₁) is preferable.

Preferable combinations of the repeating monomer units are the following examples (a) to (f).

(a): a combination of (A₁), (B₁) and (C₁), or a combination of (A₁), a mixture of (B₁) and (B₂), and (C₁),
(b): a combination of (A₁) and (A₂),
(c): the same combination as (a) expect partly replacing (A₁) with (A₂),
(d): the same combination as (a) expect partly replacing (B₁) with (B₃), (e): the same combination as (a) expect partly replacing ($C_1$) with ($C_3$), and (f): the combination of ($A_1$), ($A_2$), ($B_1$) and ($C_2$).

The liquid crystal polyester to be employed for the invention can be produced by a well-known method. For example, the liquid crystal polyesters defined as the (a) and (b) can be produced by methods described in Japanese Patent Publication No. 47-47870, Japanese Patent Publication No. 63-3888 and the like.

In the present invention, a filler may be added to the liquid crystal polyester. In the case of adding a filler, the filler is added in not more than 150 parts by weight, preferably 10 to 100 parts by weight, to 100 parts by weight of the liquid crystal polyester. If the addition ratio of the filler exceeds 150 parts by weight, the melt viscosity of the resulting composition becomes high and the pelletizing property and moldability are deteriorated.

The filler used for the present invention includes inorganic fibers such as a glass fiber, a carbon fiber, a metal fiber, an alumina fiber, a boron fiber, a titanate fiber, asbestos and the like, calcium carbonate, alumina, aluminum hydroxide, kaolin, talc, clay, mica, glass flake, glass bead, quartz sand, silica sand, wollastonite, dolomite, a variety of metal powders, powders of carbon black, graphite, barium sulfate, potassium titanate, calcined gypsum and the like, powders or whiskers of spherical or plate-like particles of silicon carbide, alumina, aluminum borate, potassium titanate, boron nitride, silicon nitride and the like, and woody powders such as a wood powder, a coconut husk powder, a walnut powder, and a pulp powder.

The means for mixing the liquid crystal polyester and the filler is not particularly limited. For example, the liquid crystal polyester, the filler and if necessary, a mold release improving agent, a coloring agent, and the like are mixed together using a Henshel mixer, a tumbler and the like and then melted and kneaded using an extruder.

The liquid crystal polyester resin composition employed for the present invention is preferable to be in a pellet-like, chip-like or powder state in order to make mixing with a fatty acid amide or a high molecular weight polyethylene easy as described later.

The fatty acid amide used for the present invention is defined as $R-CO-NH_2$ wherein R denotes a saturated or unsaturated hydrocarbon of from 10 to 30 carbons. The carbon chain of the fatty acid may be a straight chain or a branched chain.

The fatty acid amide includes, for example, decanoic acid amide (C10), lauric acid amide (C12), myristic acid amide (C14), palmitic acid amide (C15), heptadecanoic acid amide (C16), stearic acid amide (C18), linoleic acid amide (C18), linolenic acid amide (C18), oleic acid amide (C18), elaidic amide (C18), eicosanic acid amide (C20), behenic acid amide (C21), erucic acid amide (C22) and the like.

The melting point of the fatty acid amide used for the invention is preferably 30° C. or higher and more preferably 50° C. or higher. If a fatty acid amide having a melting point lower than 30° C. is used, in case where the liquid crystal polyester resin mixture is dried before molding, some of the fatty acid amide is evaporated and thus the effect of stabilizing the molding process tends may be deteriorated.

The fatty acid amide used for the present invention is preferably in a powder state with an average particle diameter of 100 μm or smaller, more preferably with an average particle diameter of 50 μm or smaller, so that the fatty acid amide is easily mixed with the liquid crystal polyester resin composition and efficiently dispersed in the resulted polyester resin mixture.

The mixing amount of the fatty acid amide is 0.001 to 5 parts by weight, preferably 0.005 to 0.5 part by weight, and more preferably 0.01 to 0.1 part by weight to 100 parts by weight of the liquid crystal polyester or to 100 parts by weight in total of the liquid crystal polyester and the filler.

If the amount of the fatty acid amide exceeds 5 parts by weight, during the molding process, a gas is evolved due to the decomposition of the fatty acid amide and thus blister causes in obtained molded article resulting in deteriorating surface appearance. On the other hand, if the mixing amount of the fatty acid amide is less than 0.001 part by weight, the effect of stabilizing the plastication time is insufficient.

The high molecular weight polyethylene used for the present invention is a polyethylene having a molecular weight of 10,000 or higher. If the molecular weight is less than 10,000, the plastication time is inconstant to make molding in constant cycles difficult.

In order to make mixing with the liquid crystal polyester resin composition easy and to efficiently carry out dispersion in the liquid crystal polyester resin mixture at the time of the molding process, the high molecular weight polyethylene is preferably in a powder state with an average particle diameter of 1,000 μm or smaller, more preferably with an average particle diameter of 200 μm or smaller.

The mixing amount of the high molecular weight polyethylene is from 0.001 to 2 parts by weight, preferably from 0.001 to 0.1 parts by weight to 100 parts by weight of the liquid crystal polyester or to 100 parts by weight in total of the liquid crystal polyester and the filler. If the amount of the high molecular weight polyethylene exceeds 2 parts by weight, during the molding process, a gas is evolved due to the decomposition of the high molecular weight polyethylene and thus blister cause in the resulting molded article resulting in deteriorating surface appearance. On the other hand, if the mixing amount of the high molecular weight polyethylene is less than 0.001 part by weight, the effect of stabilizing the plastication time is insufficient.

The liquid crystal polyester resin composition of the present invention may be mixed with an extra-additive of such as a higher fatty acid metal salt, a phosphorus compound, a fluoro resin and the like, having a lubricating effect to the extent that it does not affect the purpose of the invention.

Further, as far as the object of the present invention is not deteriorated, a common additive such as a coloring agent, e.g., a dye and a pigment, an antioxidant, a thermal stabilizer, an ultraviolet absorbent, an antistatic agent, a surfactant and the like may be added.

Further, to the extent that the object of the present invention is not affected, a thermoplastic resin such as a polyamide, a polyester, a polyphenylene sulfide, a polyether ketone, a polycarbonate, a polyphenylene ether, a polysulfone, a polyether sulfone, a polyether imide and the like and a thermosetting resin such as a phenol resin, an epoxy resin, a polyimide resin and the like may be added.

The liquid crystal polyester resin mixture of the present invention means a mixture obtained by mixing the liquid crystal polyester with the foregoing fatty acid amide or high molecular weight polyethylene at a temperature not higher than the fluidizing temperature of the liquid crystal polyester, or mixing the liquid crystal polyester resin composition, which comprises the liquid crystal polyester and the filler, with the foregoing fatty acid amide or high molecular weight polyethylene at a temperature not higher than the fluidizing temperature of the liquid crystal polyester resin composition. Incidentally, as long as the mixing is carried out at the fluidizing temperature or lower, the mixing method is not particularly limited. For example, the particle of the liquid crystal polyester resin composition and the fatty acid amide powder are mixed in solid state as they are at a room temperature or in heating condition using a Henshel mixer, a tumbler, and the like.

The fluidizing temperature means the temperature at which the melt viscosity of a resin reaches 48,000 poise in the case the resin is heated at 4° C./min heating rate and extruded out of a nozzle with an inner diameter of 1 mm and a length of 10 mm under 100 kgf/cm$^2$ load condition.

Since the resin mixture of the present invention has a stabilized plasticization time, the resin mixture is suitable for a molding method to be carried out using an apparatus with which a constant amount of the resin pellet is heated, melted and metered by a screw such as injection molding, extrusion molding (including film molding, inflation molding), and an injection compression molding.

In the injection molding, the time taken for weighing step (the plasticization time) in an injection unit is constant and stabilized, so that the melting state is stabilized and it is easy to determine the molding condition that defective phenomenon such as short shot and flash formation does not cause.

The resin mixture of the invention is useful for a raw material for example, electric and electronic parts such as a connector, a socket, a relay part, a coil bobbin, an optical pick-up, an oscillator, a printed wiring board, computer relating parts, and the like; semiconductor production process relating parts such as an IC tray, a wafer carrier and the like; parts of domestic electric equipment such as a VTR, a television, an iron, an air conditioner, a stereo record player, an electric cleaner, a refrigerator, a rice cooker, a luminaire and the like; luminaire parts such as a lamp reflector, a lamp holder and the like; audio product parts such as a compact disk, a laser disk, a speaker and the like; communication appliance parts such as a ferrule for an optical cable, a telephone part, a facsimile parts, a modem and the like; copying machine and printing apparatus relating parts such as a separation claw, a heater holder and the like; machine parts such as an impeller, a fan gear, a gear, a bearing, a motor part, a case, and the like; automotive parts such as an automotive mechanical part, an engine part, an engine room interior part, an electric appliance part, an interior part and the like; cooking appliances such as a microwave cooking pan, heat resistant tableware, and the like; construction materials and engineering and building materials such as a heat insulating and sound insulating material for a floor material and a wall material, a supporting material for a beam and a column, a roof material and the like; aircraft, space craft, and aerospace appliance parts; radiation facility parts of a nuclear furnace and the like; marine facility parts; jigs for washing; optical appliance parts, valves; pipes; nozzles; filters; membranes, medical equipment parts and medical materials; sensor parts; sanitary goods; articles for sports; articles for leisure; and the like.

A film-like or sheet-like material produced by processing the resin mixture of the invention or a material produced by processing such a material is an industrially useful material and employed for a display device part, an electric insulation film, a film for a flexible circuit substrate, a film for wrapping, a film for a recording medium, and the like.

Since the resin mixture of the invention is excellent in the extrusion moldability, the mixture is useful for a resin molded product, a coating material of a metal part and employed for coating in a variety of fields such as pipe coating, electric wire coating and the like.

A fibrous material such as a continuous fiber, a short fiber and pulp produced by processing the resin mixture of the invention and a material produced by processing such a fibrous material are industrially useful materials and employed as a clothing material, a heat resistant and heat insulating material, a reinforcing material for FRP, a rubber reinforcing material, a rope, a cable, an unwoven fabric, and the like.

Experimental

Hereinafter, the invention will be described with the reference to examples.

The measurements and experiments of a variety of physical properties in the examples were carried out as follows.
(1) The Plastication Time of Injection Molding:
ASTM no. 4 specimens were molded and the average plasticization time of continuous 50 shots for molding the specimens and the standard deviation were computed.
(2) The Tensile Characteristic:
ASTM no. 4 dumbbells were molded and measurement was carried out in accordance with ASTM D 638.
(3) The Relative Amount of the Low Boiling Point Gases Evolved from the Molded Products:
JIS no. 1 (½) dumbbells (the thickness of 0.8 mm) were molded and the obtained molded products were cut into chips with a length of 5 mm, a width of 5 mm, and a thickness of 0.8 mm. The chips in 4 g were precisely weighed and washed with distilled water, then put in a vacuum dried vial of a 25 cc capacity, and sealed with a packing made of a polytetrafluoroethylene and after that, the chips were heated for 20 hours in a hot air drying apparatus set at 120° C. to evolve gases from the molded products. The vial was installed in a head space gas chromatograph (GC-15A/HSS-3A) manufactured by Shimadzu Corporation, and while keeping temperature at 120° C., injected into a column of 50 m×ϕ0.25 mm employing HR-1701 (produced by SHINWA CHEMICAL INDUSTRIES, Ltd.) as a filler and at the same time of the injection, the column temperature was kept at 40° C. for 5 minutes and heated to 280° C. at 10° C./min and then kept still for 5 minutes, and the total amount of the gases from the starting to 34 minutes later was detected by a detector. An FID model was employed as the detector and helium was used as a carrier gas. The relative amounts of the gases were defined as the collective surface area of a variety of gases and the relative amounts of the gases evolved from the molded products were compared. That the value was high meant that the evolution of the low boiling point gases from the molded products was high.

Based on gas chromatography/mass spectrometry (GC/MS), the evolved gases that was detected by 34 minutes later were found including aromatic hydrocarbons, aliphatic hydrocarbons, acetic acid, and phenols.

EXAMPLES 1 TO 5, COMPARATIVE EXAMPLES 1 TO 4

Liquid crystal polyester resin compositions were obtained by mixing liquid crystal polyesters composed of $A_1$, $B_1$, $B_2$, and $C_1$ of the above described repeating monomer units in $A_1$:$B_1$:$B_2$:$C_1$ mole ratio of 60:15:5:20 and having a fluidizing temperature as defined above of 324° C. with a milled glass fiber (EFH 75-01 manufactured by Central Glass Co., Ltd.) in 60:40 ratio by weight by a Henshel mixer, and pellettizing the mixtures at a cylinder temperature of 340° C. using a biaxial extruder (PCM-30 model manufactured by Ikegai Corporation). Each of the obtained liquid crystal polyester resin compositions had a column-like shape with an average particle diameter of 2 mm and a length of 2.5 mm. To each 100 parts by weight of the obtained liquid crystal polyester resin compositions, compounds shown in Table 1 in parts by weight as shown in Table 1 were added in order to improve the stability of the plastication time and mixed at a room temperature using a tumbler to obtain liquid crystal polyester resin mixtures.

These liquid crystal polyester resin mixtures were dried at 150° C. for 3 hours and molded into JIS no. 4 dumbbells (the thickness of 2.5 mm) at a cylinder temperature of 350° C. and a die temperature of 130° C. using an extrusion molding apparatus (PS4OE5ASE manufactured by Nissei Plastic Industrial Co., Ltd.) and the plasticization time of continuous 50 shots was measured to evaluate the stability. The tensile strength of the obtained molded products were evaluated and JIS 1(½) dumbbells were produced and gas evolution amounts of the obtained dumbbells were measured.

In the same manner, a liquid crystal polyester resin composition (Comparative example 1) containing no fatty acid amide was subjected to the measurement of the stability of the plastication time, the tensile physical characteristics, and the gas evolution amount.

The mixtures of the liquid crystal polyester resin compositions with specified amounts of specified fatty acid amides were found having shortened plastication time, being stably plasticized and at the same time having excellent mechanical and physical properties and evolving a gas in a low level from their molded products as compared with those of other mixtures.

The fatty acid amides in Table 1 for improvement of the stability of the plastication time were the following commercialized products ground by a crucible and used as particles with a particle size passing through 200 meshes:

Erucic acid amide: trade name: Armoslip E produced by Lion Akzo Co., Ltd.;

oleic acid amide: trade name: Armoslip CP produced by Lion Akzo Co., Ltd.;

stearic acid amide: trade name: Fatty Amide S produced by Kao Corporation;

calcium stearate: produced by Kishida Chemical Co., Ltd.

TABLE 1

| | liquid crystal polyester resin composition (parts by weight) | fatty acid amide mixture (parts by weight) | plastication time | | tensile physical characteristic | | evolved gas amount (relative amount) |
| --- | --- | --- | --- | --- | --- | --- | --- |
| | | | average time (sec) | standard deviation (sec) | strength (MPa) | elongation (%) | |
| Example 1 | 100 | erucic acid amide 0.005 | 14.8 | 4.6 | 136 | 6.5 | 984 |
| Example 2 | 100 | erucic acid amide 0.02% | 9.84 | 0.39 | 135 | 6.5 | 1192 |
| Example 3 | 100 | erucic acid amide 0.05 | 5.32 | 0.12 | 136 | 6.4 | 1172 |
| Example 4 | 100 | oleic acid amide 0.02 | 6.90 | 0.43 | 135 | 6.5 | 1025 |
| Example 5 | 100 | stearic acid amide 0.02 | 18.5 | 3.4 | 137 | 6.3 | 1105 |
| Comparative Example 1 | 100 | none | 22.0 | 15.2 | 134 | 6.2 | 755 |
| Comparative Example 2 | 100 | erucic acid amide 0.0005 | 20.5 | 13.5 | 135 | 6.7 | 854 |
| Comparative Example 3 | 100 | erucic acid amide 10.0 | >180 | — | 79 | 4.2 | 8541* |
| Comparative Example 4 | 100 | calcium stearate 0.02 | 26.7 | 9.2 | 135 | 6.8 | 735 |

*foaming of the molded product

EXAMPLES 6 TO 10, COMPARATIVE EXAMPLES 5 TO 7

Liquid crystal polyester resin compositions were obtained by mixing liquid crystal polyesters composed of $A_1$, $B_1$, $B_2$, and $C_1$ of the above described repeating monomer units in $A_1$:$B_1$:$B_2$:$C_1$ mole ratio of 60:15:5:20 and having a fluidizing temperature as defined above of 324° C. with a milled glass fiber (EFH 75-01 manufactured by Central Glass Co., Ltd.) in 60:40 ratio by weight by a Henshel mixer, and pellettizing the mixtures at a cylinder temperature of 340° C. using a biaxial extruder (PCM-30 model manufactured by Ikegai Ironworker Co., Ltd.). Each of the obtained liquid crystal polyester resin compositions had a column-like shape with an average particle diameter of 2 mm and a length of 2.5 mm. To each 100 parts by weight of the obtained liquid crystal polyester resin compositions, a high molecular weight polyethylene in parts by weight as shown in Table 2 was added in order to improve the stability of the plastication time and mixed at a room temperature using a tumbler to obtain liquid crystal polyester resin mixtures.

These liquid crystal polyester resin mixtures were dried at 150° C. for 3 hours and molded into JIS no. 4 dumbbells (the thickness of 2.5 mm) at a cylinder temperature of 350° C. and a die temperature of 130° C. using an extrusion molding apparatus (PS4OE5ASE manufactured by Nissei Resin Industry Co., Ltd.) and the plastication time of continuous 50 shots was measured to evaluate the stability. The tensile physical characteristics of the obtained molded products were evaluated and JIS 1(½) dumbbells were produced and gas evolution amounts of the obtained dumbbells were measured.

In the same manner, a liquid crystal polyester resin composition (Comparative example 5) containing no high molecular weight polyethylene was subjected to the measurement of the stability of the plasticization time, the tensile physical characteristics, and the gas evolution amount.

The mixtures of the liquid crystal polyester resin compositions with specified amounts of the high molecular weight polyethylene were found having shortened plastication time, being stably plasticized and at the same time having excellent mechanical and physical properties and evolving a gas in a low level from their molded products as compared with those of other mixtures.

The employed high molecular weight polyethylene shown in Table 2 were ground by a crucible and used as particles with a particle size passing through 200 meshes.

molecular weight polyethylene with a molecular weight of 10,000 or higher.

2. The liquid crystal polyester resin mixture according to claim 1, wherein the liquid crystal polyester is a resin containing at least 30% by mole of a repeating monomer unit defined as the following formula $A_1$:

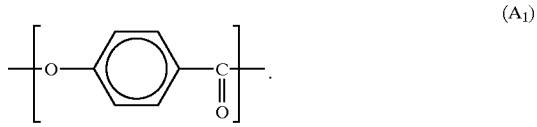

3. The liquid crystal polyester resin mixture according to claim 1, wherein the liquid crystal polyester resin composition is mixed with the fatty acid amide or the high molecular weight polyethylene at a temperature lower than the fluidizing temperature of the liquid crystal polyester resin composition.

4. A liquid crystal polyester resin molded article comprising the liquid crystal polyester resin mixture as described in claim 1.

5. The liquid crystal polyester resin molded article according to claim 4, wherein the liquid crystal polyester is a resin containing at least 30% by mole of a repeating monomer unit defined as the following formula $A_1$:

TABLE 2

|  | liquid crystal polyester resin composition (parts by weight) | polyethylene molecular weight mixing amount (parts by weight) | plastication time | | tensile physical characteristic | | evolved gas amount |
|---|---|---|---|---|---|---|---|
|  |  |  | average time (sec) | standard deviation (sec) | strength (MPa) | elongation (%) | (relative amount) |
| Example 6 | 100 | 490000 0.02 | 16.9 | 3.0 | 136 | 6.5 | 785 |
| Example 7 | 100 | 210000 0.005 | 11.6 | 1.3 | 137 | 6.6 | 805 |
| Example 8 | 100 | 210000 0.02 | 10.0 | 1.3 | 134 | 6.4 | 745 |
| Example 9 | 100 | 210000 0.05 | 12.6 | 1.1 | 136 | 6.5 | 830 |
| Example 10 | 100 | 5750000 0.02 | 27.3 | 5.9 | 136 | 6.5 | 751 |
| Comparative Example 5 | 100 | none | 22.0 | 15.2 | 134 | 6.2 | 755 |
| Comparative Example 6 | 100 | 490000 5 | >180 | — | 86 | 4.0 | 4560[*1] |
| Comparative Example 7 | 100 | 8000 0.02 | 140 | 7.8 | 134 | 6.5 | 813 |

Since a liquid crystal polyester resin mixture of the invention has a stabilized plastication time, the mixture can be molded in constant cycles and molded products excellent in the mechanical properties and thermal stability can be produced.

What is claimed is:

1. A liquid crystal polyester resin mixture comprising 100 parts by weight of a liquid crystal polyester resin composition which comprises 100 parts by weight of a liquid crystal polyester and from 0 to 150 parts by weight of a filler, and either from 0.001 to 5 parts by weight of a fatty acid amide having a formula; $R_1$—CO—NH$_2$ (wherein $R_1$ denotes a saturated or unsaturated hydrocarbon of from 10 to 30 carbons) or from 0.001 to 2 parts by weight of a high

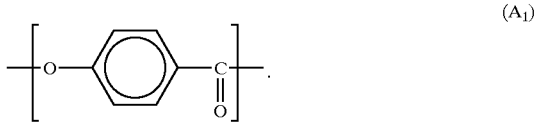

6. A method for producing a liquid crystal polyester resin molded article comprising steps of heating a liquid crystal polyester resin mixture comprising 100 parts by weight of a liquid crystal polyester resin composition which comprises 100 parts by weight of liquid crystal polyester and from 0 to 150 parts by weight of a filler, and either from 0.001 to 5 parts by weight of a fatty acid amide having a formula;

$R_1$—CO—$NH_2$ (wherein $R_1$, denotes a saturated or unsaturated hydrocarbon of 10 to 30 carbons) or 0.001 to 2 parts by weight of a high molecular weight polyethylene with a molecular weight of 10,000 or higher; melting the liquid crystal polyester resin mixture, weighing the melted liquid crystal polyester resin mixture, and molding the melted liquid crystal polyester resin mixture.

* * * * *